United States Patent Office 2,900,196
Patented Aug. 18, 1959

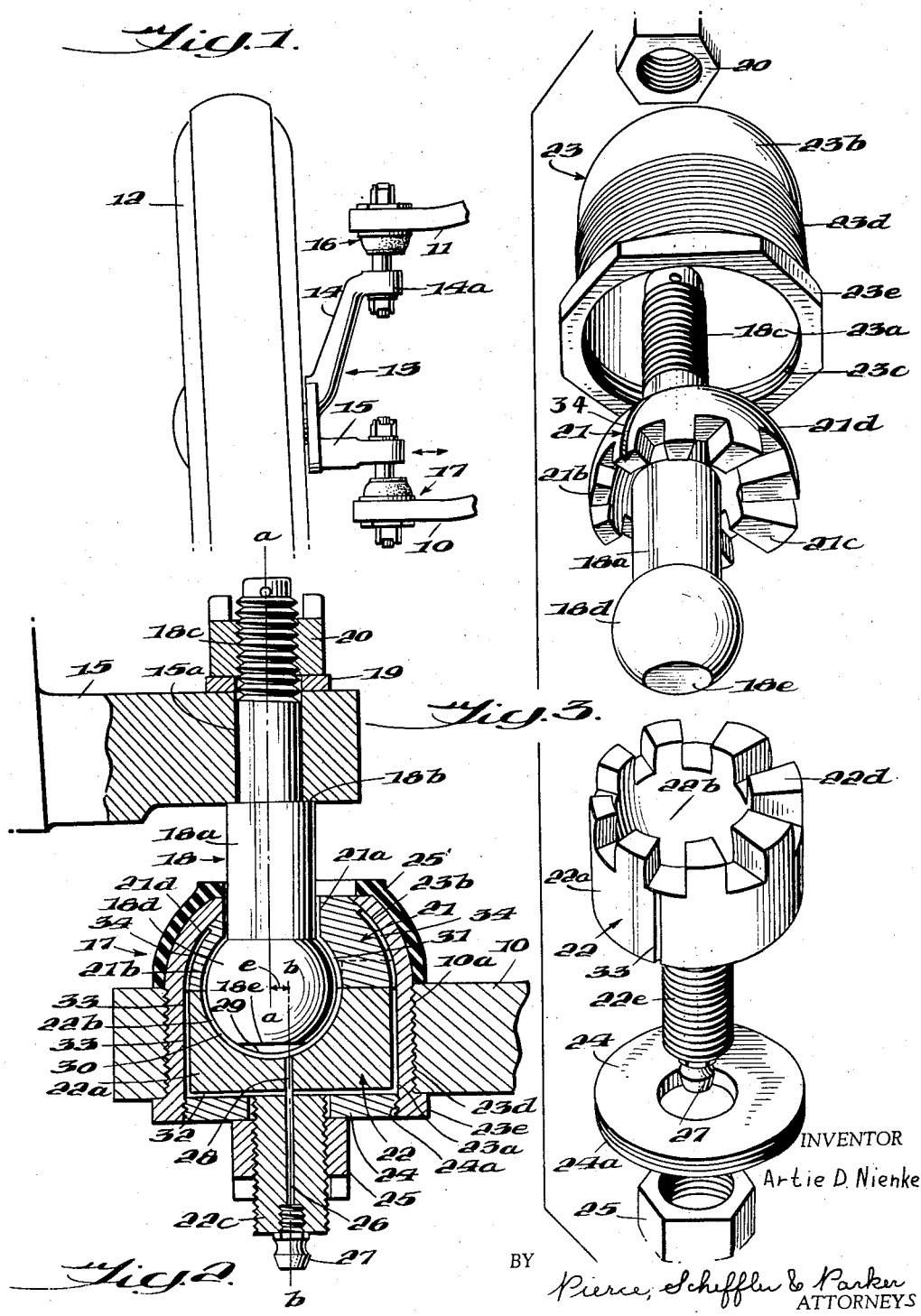

2,900,196

ECCENTRICALLY OFFSET BALL JOINT FOR FRONT WHEEL STUB AXLE SUSPENSION

Artie D. Nienke, Roanoke, Va.

Application January 23, 1958, Serial No. 710,754

4 Claims. (Cl. 280—96.1)

The present invention relates to front wheel suspensions for the steerable wheels of an automobile and like vehicles, and more particularly to wheel suspensions of the so-called "ball joint" type wherein the suspension for each wheel includes one or more universal joints of the ball and socket type connecting the stub axle for the wheel to the upper and lower control arms of an individual wheel suspension system such as those commonly known as the "wishbone" type.

An object of the invention is to provide an improved wheel suspension of the type described wherein the ball and socket universal joints are constructed in an eccentric manner so as to enable one to effect an adjustment in the caster and camber of the wheel mounted on the stub axle.

A more particular object is to provide an improved wheel suspension featuring adjustable eccentric ball and socket joints wherein the ball member of the joint is located centrically with respect to the longitudinal axis of the joint and wherein the socket member of the joint is located eccentrically of such axis, the ball member being fixed as to position and the socket member being adjustable in rotation about the joint axis to different positions thus to effect an adjustment in the caster and camber of the wheel.

Still a further object of the invention is to provide an improved wheel suspension featuring adjustable eccentric ball and socket joints wherein the socket member is constructed eccentrically and is made in two separable, mating halves, each half establishing a hemispherical cavity for the ball member, and the two halves of the socket being provided with co-engaging, interlocking means such as for example ribs and grooves thus locking the halves together for simultaneous rotational adjustment eccentrically on and with respect to the centric ball member.

Yet a further object of the invention is to provide an improved ball and socket joint of the adjustable eccentric type featuring an improved greasing system which prevents the ball and socket members from freezing so that such members will always be certain to remain free for relative rotation when an adjustment therebetween is desired.

The foregoing and other objects and advantages inherent in the invention will become more apparent from the following detailed description of a preferred embodiment and the accompanying drawings illustrating the same.

In the drawings:

Fig. 1 is a fragmentary view in front elevation of a wheel suspension featuring the improved eccentric ball and socket joints according to the invention connecting the upper and lower control arms of the wishbone structure with the stub axle on which the front steerable wheel is mounted.

Fig. 2 is a vertical central section of the upper joint; and

Fig. 3 is an exploded view in perspective of the parts of the improved joint.

With reference now to the drawings and Fig. 1 in particular, reference numeral 10 designates the end portion of the lower control arm of an individual steerable wheel suspension system which can be of the so-called "wishbone" type. Reference numeral 11 represents the end portion of the upper control arm of the suspension system. The complete arm structure and remaining components of the suspension system have not been illustrated since the details of construction are well known to the art and, moreover, do not, per se, form any part of the present invention.

The stub axle or knuckle provided with a spindle on which the steerable wheel 12 is mounted, is indicated at 13 and includes an upwardly and inwardly extending upper arm 14 terminating in a horizontal end portion 14a. Axle 13 also includes a horizontal and inwardly extending lower arm 15. The upper arm 14 is connected at its inner horizontal end portion 14a to the upper control arm 11 by means of an improved ball and socket joint 16 in accordance with the present invention, and the inner end of the lower arm 15 is similarly connected to the lower control arm 10 by means of another ball and socket joint 17 of the same construction as joint 16.

Fig. 2 shows the details of construction of the lower ball and socket joint 17 in accordance with the invention. As explained in the introduction and stated objects, the improved ball and socket joint features a centric ball and an eccentric socket or seat with provisions for adjusting the socket rotationally about the joint axis in order to adjust the camber and caster of the wheel 12. It has already been proposed to establish an adjustable eccentricity in ball and socket joints for front wheel suspension systems by making the ball member eccentric with respect to the joint axis. However, such a construction suffers from a serious disadvantage that by offsetting the ball from its supporting shaft, there is less strength at the junction between the ball and shaft to resist the high stresses which are concentrated at such junction during a turning movement of the steerable wheels. Consequently, there is considerable danger of breakage of the joint at the junction between the ball and its supporting shaft. The possibility of breakage is lessened with the present construction wherein the ball member is located centrically with respect to its support shaft and the desired eccentricity is established by offsetting the seat or socket from the axis of the joint.

The lower arm member 15 is provided with a vertical bore 15a for receiving the shank portion 18a of the balled member 18 of the joint. Shank portion 18a is provided with a shoulder 18b which seats against the underface of the arm 15 and the upper portion of the shank which extends through the bore 15a is provided with a threaded portion 18c for receiving a washer 19 and lock nut 20 which can be of any suitable type. The balled portion 18d is formed at the lower end of the shank 18a and is centered with respect to the longitudinal axis a—a of the shank 18a.

The socket member of the joint is made in two separable halves. The upper half 21 of the socket is provided with a bore 21a through which is passed the shank portion 18a, this bore and the shank portion being of substantially the same diameter to provide a pass through fit, and a spherically curved seat portion 21b for seating against the upper half of the ball 18d. The lower half 22 of the socket is constituted by a cylindrical body portion 22a having a spherically curved seat portion 22b for seating against the lower half of the ball 18d and a depending threaded stud portion 22c located concentric with the cylindrical body portion 22a. As shown in Fig. 2, the two part seat 21b, 22b is eccentric to the longitudinal axis b—b of the socket through the center of the cylindrical body portion 22a and threaded stud portion 22c thus providing a joint eccentricity equal to the distance or vertical offset e between the ball axis a—a and the socket axis b—b. To prevent the upper and lower socket parts 21, 22 from turning relative to each other, it will be seen from Fig. 3 that the periphery of the upper socket half 21 is provided with a plurality of equally spaced lugs 21c which enter the spaces between corresponding spaced lugs 22d provided at the periphery of the lower socket half 22 thus locking the two halves together so that they will rotate as a unit when an adjustment is to be made.

The two part socket 21, 22 is fitted within a bell-shaped casing 23, the interior of which has a configuration corresponding to the exterior configuration of the joined upper and lower socket halves 21, 22. Thus the lower portion 23a of the interior wall of casing 23 is of generally cylindrical configuration to fit snugly against the lower cylindrical socket surface 22a, and the upper portion 23b of the interior wall of casing 23 is generally dome shaped to make a snug fit with the generally dome shaped outer surface 21d of the upper socket member 21. The two part socket is retained in the casing 23 by suitable means such as an annular plate 24 having a threaded periphery 24a which is threadedly engaged with internal threads 23c located at the lower end of casing 23, the plate 24 being threaded into the casing until it engages but does not bind against the under face of the cylindrical portion 22a of the lower socket half 22.

The exterior cylindrical surface portion cf casing 23 is threaded at 23d for threading into an internally threaded vertical hole 10a in the lower control arm 10, the bottom of the casing being constituted as a hexagonal flange 23e so as to enable the casing to be screwed tightly into place on the control arm 10.

In order to maintain the socket 21, 22 in a particular position within the casing 23, a nut 25 which can be of the self-locking type is threaded onto the depending stud portion 22c of the lower socket half 22 and is caused to be tightened against the under face of plate 24 thus drawing the under face of the cylindrical socket portion 22a against the upper face of plate 24.

If desired, a rubber boot 25' may be applied around the stud 18 and upper domed portion 23b of the casing 23.

In order to lubricate the joint, it will be seen that a grease channel 26 extends from a grease fitting 27 threaded into the lower end of stud 22c upwardly through the latter and through a channel 28 in alignment therewith in the cylindrical socket portion 22a to a grease chamber 29 established between a flat 18e at the bottom of ball 18d and the spherical seating surface 22b. Grease channels 30 extend from chamber 29 in the spherical surface 22b in the lower socket half and the channels 30 communicate with other grease channels 31 in the spherical surface 21b so that grease can better be forced between the ball 18d and its spherical seating surfaces 22b and 21b.

Also, in order to prevent the socket 21, 22 from freezing in the casing 23, other horizontal grease channels 32 communicating with the grease channel 26 may be provided in the under face of the cylindrical socket portion 22a and the channels 32 may in turn communicate with vertical grease channels 33 extending upwardly along the periphery of the cylindrical socket portion 22a, and the grooves 33 in turn communicate with grease channels 34 in the domed portion 21d of the upper socket half 21.

In brief summary of the operation of my improved eccentric ball and socket joint, a change in the adjustment of the camber of wheel 12 is accomplished by first backing off on the locking nut 25 on the threaded stud portion 22c which unlocks, so to speak, the socket 21, 22 portion of the joint in the casing 23. The stud portion 22c is now turned about its axis by means of any suitable wrench applied thereto, the stud portion 22c being provided for example with a flat, not shown, to receive the wrench. Turning of the stud portion 22c causes the socket 21, 22 to be adjusted rotationally about the axis b—b, and the ball 18b and shank 18a and arm 15 will thus be caused to shift longitudinally of the lower control arm 10, i.e. in a direction transverse to the longitudinal axis of the vehicle frame, as indicated by the double arrow, thus adjusting the camber of the wheel 12. When the proper wheel camber has been obtained, the locking nut 25 is retightened thus to lock the socket 21, 22 in that position of adjustment within the casing 23.

Since the center of the ball 18d moves in a circle about the axis b—b of socket 21, 22, the ball 18d and the lower arm 15 of the stub axle or knuckle 13 will also be caused to shift longitudinally of the vehicle frame in a forward or rearward direction thus bringing about an adjustment in the caster of the wheel 12.

If it is desired also to be able to adjust caster and camber of the wheel 12 by changing the position of the upper arm 14 of the stub axle unit 13, the upper ball and socket joint 16 can be of the same eccentric construction as the lower joint 17 which has been described above in detail. However, it may be satisfactory to make one of the ball and socket joints, either the upper or lower one, of a centric construction and the other ball and socket joint of the eccentric type that has been described. In that case, the adjustment in wheel camber and caster is effected by means of the eccentric ball and socket joint.

In conclusion, it will be understood that various changes may be made in the construction and arrangement of component parts without, however, departing from the spirit and scope of the invention as defined in the appended claims.

I claim:

1. In a suspension device for independently supporting a front steerable wheel of a vehicle comprising upper and lower vertically spaced control arms secured to the vehicle frame and a knuckle member having a spindle on which the wheel is mounted and upper and lower arms disposed above and below the spindle axis for connection respectively to said upper and lower control arms, the improvement constituted by a ball and socket joint connecting one of said control arms with one of said arms of said knuckle member, said joint comprising an integral ball and shank, said ball being located centrically with respect to the longitudinal axis of said shank, means securing said shank to one of said arms, and a socket member supported by the other arm, said socket member comprising upper and lower separable portions each including eccentric spherically curved seats receiving respectively the upper and lower portions of said ball, means interlocking said separable socket portions to prevent relative rotation therebetween, a threaded stud portion depending from said lower socket portion and a lock nut on said stud portion coacting with a part fixed with respect to said other arm for securing said upper and lower socket portions in a desired position of rotational adjustment about the longitudinal axis thereof.

2. In a suspension device for independently supporting a front steerable wheel of a vehicle comprising upper and lower vertically spaced control arms secured to the vehicle frame and a knuckle member having a spindle on which the wheel is mounted and upper and lower arms disposed above and below respectively the spindle axis for connection respectively to said upper and lower control arms, the improvement constituted by a ball and socket joint connecting one of said control arms with one of said arms of said knuckle member, said joint comprising an integral ball and shank, said ball being located centrically with respect to the longitudinal axis of said shank, means securing said shank to one of said arms, a casing secured to the other arm, and a socket member mounted in said casing for rotational adjustment about its longitudinal axis, the outer surface of said socket member having a configuration complementary to the inner surface of said casing and said surfaces being disposed in contact with each other, said socket member comprising upper and lower separable portions each including eccentric spherically curved seats receiving respectively the upper and lower portions of said ball, means interlocking said separable portions to prevent relative rotation therebetween, a threaded stud portion depending from said lower socket portion and extending through the lower end wall of said casing and means for securing said socket member in a selected position of rotational adjustment within said casing comprising a lock nut on said threaded stud portion adapted to bear against the lower wall of said casing.

3. A suspension device as defined in claim 2 wherein said threaded stud portion includes a grease channel extending longitudinally therethrough and communicating with other grease channels disposed in the contacting surfaces of said casing and socket member.

4. A suspension device as defined in claim 2 wherein said threaded stud portion includes a grease channel extending longitudinally therethrough and communicating with grease channels located in said spherically curved ball seat.

References Cited in the file of this patent

UNITED STATES PATENTS

| | | |
|---|---|---|
| 1,073,264 | Mayer et al. | Sept. 16, 1893 |
| 1,002,229 | Curtis | Sept. 5, 1911 |
| 1,646,288 | Graham | Oct. 18, 1927 |
| 1,803,257 | Hufferd | Apr. 28, 1931 |
| 2,405,458 | Slack et al. | Aug. 6, 1946 |
| 2,757,029 | Latzen | July 31, 1956 |
| 2,823,055 | Booth | Feb. 11, 1958 |
| 2,848,260 | Moskovitz | Aug. 19, 1958 |

FOREIGN PATENTS

| | | |
|---|---|---|
| 850,296 | France | Sept. 4, 1939 |